United States Patent [19]

Schonlau

[11] Patent Number: 5,140,904
[45] Date of Patent: Aug. 25, 1992

[54] PISTON SEALING ARRANGEMENT FOR PRESSURE-FLUID-OPERATED SYSTEMS

[75] Inventor: Juergen Schonlau, Walluf, Fed. Rep. of Germany

[73] Assignee: Alfred Teves GmbH, Frankfurt, Fed. Rep. of Germany

[21] Appl. No.: 720,345

[22] Filed: Jun. 25, 1991

[30] Foreign Application Priority Data

Jun. 29, 1990 [DE] Fed. Rep. of Germany ....... 4020671

[51] Int. Cl.⁵ .............................................. F15B 15/26
[52] U.S. Cl. .......................................... 92/27; 92/28; 92/130 R; 277/175; 277/177; 277/176; 277/205; 91/41; 91/44
[58] Field of Search ............... 277/173, 175, 177, 176, 277/205; 92/28, 27, 18, 19, 162 R, 193, 194, 130 R, 131; 91/41, 44, 45

[56] References Cited

U.S. PATENT DOCUMENTS

| | | | |
|---|---|---|---|
| 1,489,608 | 4/1924 | Miller | 92/193 |
| 1,536,426 | 5/1925 | Deakins et al. | 92/193 |
| 1,646,143 | 10/1927 | Forster | |
| 2,324,724 | 7/1943 | Rappl et al. | 92/28 |
| 2,341,803 | 2/1944 | Mott | |
| 2,417,504 | 3/1947 | Knaggs et al. | 277/173 |
| 2,602,428 | 7/1952 | Randol | 91/41 |
| 2,610,846 | 9/1952 | Hanna | |
| 3,146,683 | 9/1964 | Hoffmann | |
| 3,150,569 | 9/1964 | Attermeyer | 92/28 |
| 3,511,048 | 5/1970 | Nemetz | 92/18 |
| 3,520,542 | 7/1970 | Fruehauf | |
| 3,863,545 | 2/1975 | Kesti | 91/45 |
| 4,160,551 | 7/1979 | Nixon | |
| 4,300,776 | 11/1981 | Taubermann | |

FOREIGN PATENT DOCUMENTS

| | | |
|---|---|---|
| 1953042 | 1/1967 | Fed. Rep. of Germany |
| 0258657 | 12/1967 | Fed. Rep. of Germany |
| 1625914 | 7/1970 | Fed. Rep. of Germany |
| 2647247 | 5/1977 | Fed. Rep. of Germany |
| 8420747 | 11/1984 | Fed. Rep. of Germany |
| 1331149 | 5/1963 | France |
| 104197 | 5/1961 | Norway ............... 277/177 |

Primary Examiner—Thomas E. Denion
Attorney, Agent, or Firm—Robert P. Seitter; J. Gordon Lewis

[57] ABSTRACT

A piston sealing arrangement for pressure-fluid-operated systems is disposed in an annular recess of a piston (5) or an associated housing (4) and is composed of a sealing ring element (1A, 1B) as well as an elastic element (2, 3) acting on one side in opposition to the direction of the pressure force (A). Herein the elastic element is dimensioned such that the sealing ring element (1) moves against its elastic element (2, 3) at a pressure smaller than the force against which the piston (6) is moving and by which it is kept on its stop, a pressure-fluid film being formed as a result which safeguards a uniform initial movement of the piston to a largest possible degree.

8 Claims, 1 Drawing Sheet

PISTON SEALING ARRANGEMENT FOR PRESSURE-FLUID-OPERATED SYSTEMS

INTRODUCTION

The present invention relates to a piston sealing arrangement for pressure-fluid-operated systems of the type to be gathered from the preamble of claim 1.

BACKGROUND OF THE INVENTION

Piston sealing arrangements, e.g. in brake force regulators, are known. For example, ring seals of different profile are rigidly fitted in an annular recess of the piston or its housing. Depending on the piston's cross-section and on the force which presses the piston against its stop, for instance by a preloaded spring, a specific initial pressure is required to move the piston in opposition to this force. In the presence of great initial pressure, the ring seal deforms elastically before the piston starts to move. The axial thickness of the ring seal, that is viewed in relation to the piston axis, decreases while the radial thickness thereof increases. Due to this, the ring seal is pressed tightly against the walls to be sealed relative to one another, and upon attainment of the initial pressure the piston first has to overcome a high amount of static friction before it yields the pressure. This has as a result a jerky initial movement of the piston afflicted with a hysteresis (stick-slip effect).

Attempts have been made to avoid this by reducing the friction values and by optimizing the sealing edge. However, these attempts met with only little success. Moreover, a precisely machined sealing edge is susceptible wear.

BRIEF DESCRIPTION OF THE INVENTION

The present invention has for its object to safeguard a movement of the piston that is uniform to the largest possible extent by means of a simple and wear-resistant arrangement.

This object is achieved by the features set forth in claim 1. The essence of the present invention is that an annular sealing element moves in opposition to an associated elastic element that counteracts the pressure force, already at a preload pressure which is less than the initial pressure required to initiate piston movement. A thin pressure fluid film is formed thereby between the sealing element and the walls to be sealed in relation to each other so that once the initial pressure is reached the piston itself will have to over-come only an amount of friction force much smaller than the static friction of the sealing arrangement. It is sufficient to give the piston and housing cross-sections normal dimensions in order to have the pressure act on the sealing arrangement, thereby obviating the need for additional modifications of the piston or the housing. Moreover, a like sealing arrangement is wear-resistant in comparison to an exact sealing edge.

The present invention permits various forms of embodiments. The piston sealing arrangement can be placed in an annular recess of the piston or in the mating housing.

A spring element is suitable as an elastic element of this sealing arrangement. It is favorable to use a cup spring or an undulating or wave washer owing to their small axial extension. In account of the piston resetting force and the ratio of the application surfaces, the spring rate or constant is to be chosen such that the sealing element starts to move against its compression spring so short a time before the piston that the pressure fluid film between the sealing element and the walls still exists when the initial pressure is reached. This avoids a jerky start of the piston and hence a hysteresis of the initial movement of the piston. This advantage recommends in particular to use the sealing arrangement for the regulating piston of a brake force regulator.

The annular sealing element can be a ring seal having a profile towards the pressure side which is customary and suits its purpose, the rear side whereof is shaped such as to ensure proper seating of the elastic element.

Two of the various embodiments possible are shown in the drawings.

DETAILED DESCRIPTION OF THE PREFERRED AND ALTERNATIVE EMBODIMENTS OF THE INVENTION

Figure 1A:
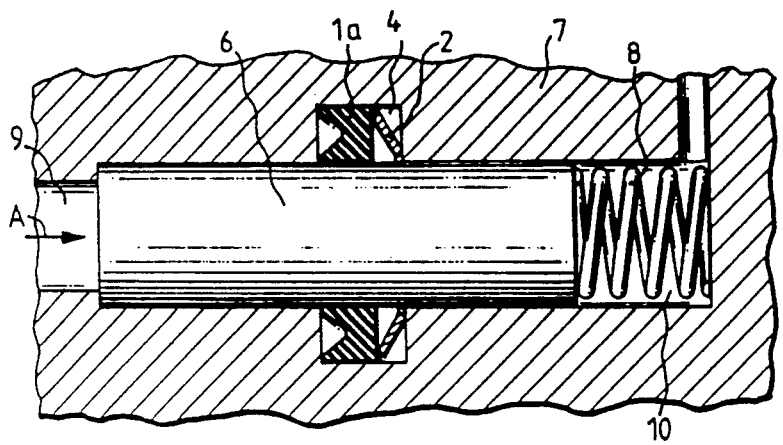
FIG. 1A, is a piston sealing arrangement with cup spring column in the housing wall.
Figure 1B:
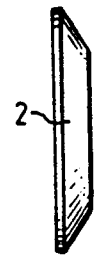
FIG. 1B, is a side view of a cup spring.
Figure 2A:
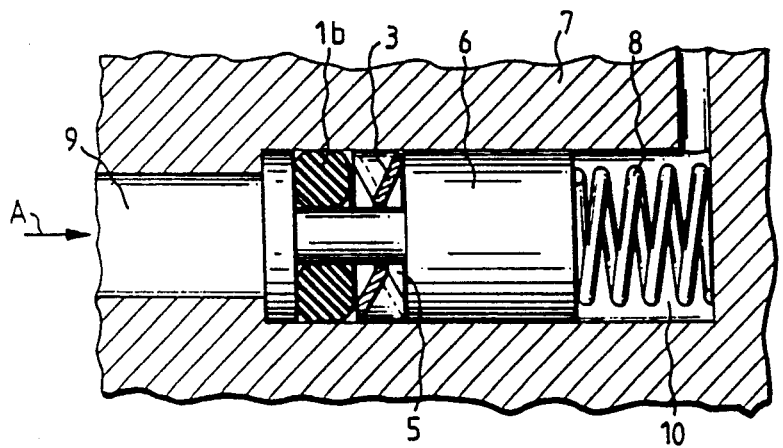
FIG. 2A, is a piston sealing arrangement with an undulating washer in the piston.
Figure 2B:
FIG. 2b, is a side view of the undulating washer.

The piston sealing arrangement 1a, 2 is placed in an annular recess 4 of the housing wall in FIG. 1A. The ring seal 1a exhibits a roughly V-shaped profile, and a cup spring 2 serves as an elastic element (see FIG. 1B). Piston 6 in FIG. 2A is furnished with an annular recess 5 in which the sealing arrangement 1b, 3 is placed. Herein an undulating washer 3 serves as an elastic element of the sealing arrangement (see FIG. 2B).

The illustrations show the piston assembly in its stop position. The pressure increasing from the direction A via pressure passage 9, the ring seal 1a and 1b will be displaced to the right in opposition to its compression spring 2 and 3, respectively, shortly before the initial pressure for the piston movement is reached so that its contact surfaces towards the piston 6 and towards the housing wall are covered with a thin film of the pressure fluid encompassing the ring seal. Once the pressure has risen up to the initial pressure, the piston 6 will start to move in opposition to an associated compression spring 8 in drain passage 10.

LIST OF REFERENCES 1 seal
2 cup spring
3 ondular washer
4 annular housing recess
5 annular recess of the piston
6 piston
7 housing
8 compression spring
9 pressure passage
10 drain passage
A direction of the pressure force

What is claimed is:
1. In combination:
   housing means defining a bore;
   a piston slidably disposed within said bore for axial positioning in response to fluid pressure axially applied thereto;
   an annular recess closed at an interface between said housing means and said piston;

an annular seal disposed within said recess;

first biasing means having a first characteristic spring constant disposed within said recess and operative to urge said seal in a direction axially opposed to said applied fluid pressure; and second biasing means having a second characteristic spring constant operative to urge said piston in a direction axially opposed to said applied fluid pressure, said second rate exceeding said first rate.

2. The combination of claim 1, wherein said second biasing means comprises a spring disposed in said bore compressively reacting between a stop defined by said housing means and said piston.

3. The combination of claim 1, wherein said annular recess is formed in said housing means and opens radially inwardly at said bore.

4. The combination of claim 1, wherein said annular recess is formed in said piston and opens radially outwardly.

5. A piston sealing arrangement for pressure-fluid-operated systems which is placed in an annular recess intermediate a piston and an associated housing, said sealing arrangement comprising a sealing ring element and an elastic element acting on one side of said sealing ring element such that the elastic element biases said sealing ring element in a direction opposed to fluid pressure applied to said piston, wherein the elastic element axially yields at lower pressure than does the piston sealed in relation to the housing.

6. A piston sealing arrangement as claimed in claim 5, wherein the elastic element of the sealing arrangement comprises a spring.

7. A piston sealing arrangement as claimed in claim 6, wherein the spring comprises a cup spring.

8. A piston sealing arrangement as claimed in claim 6, wherein the spring comprises an undulating washer.

* * * * *